(No Model.)

I. STEGEMANN.
COOKING UTENSIL.

No. 455,803. Patented July 14, 1891.

WITNESSES
Wm H Lowe
T. Coan.

INVENTOR
Ida Stegemann
by her attorneys
Roeder & Briesen

UNITED STATES PATENT OFFICE.

IDA STEGEMANN, OF NEW YORK, N. Y.

COOKING UTENSIL.

SPECIFICATION forming part of Letters Patent No. 455,803, dated July 14, 1891.

Application filed January 28, 1891. Serial No. 379,361. (No model.)

*To all whom it may concern:*

Be it known that I, IDA STEGEMANN, of New York city, New York, have invented an Improved Cooking Utensil, of which the following is a specification.

This invention relates to an improved cooking utensil particularly designed for roasting beef over the pot-hole of a stove, while the utensil may, however, be also used for preparing pot-roasts and other articles of food.

The invention consists in the various features of improvement, more fully pointed out in the claim.

Figure 1:
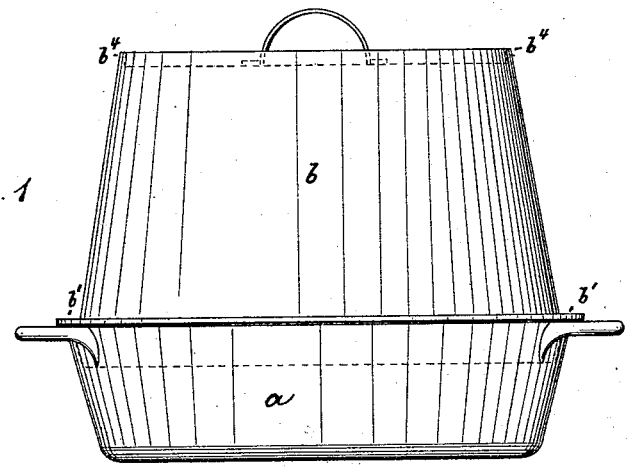
Figure 2:
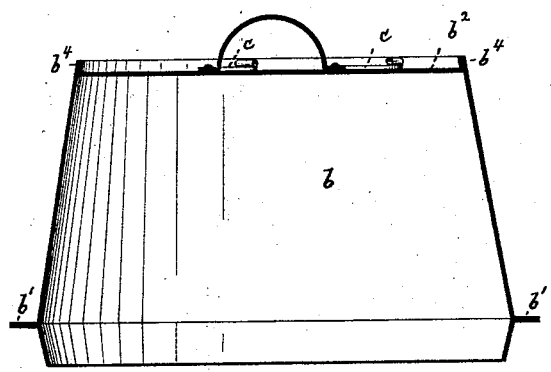
Figure 3:
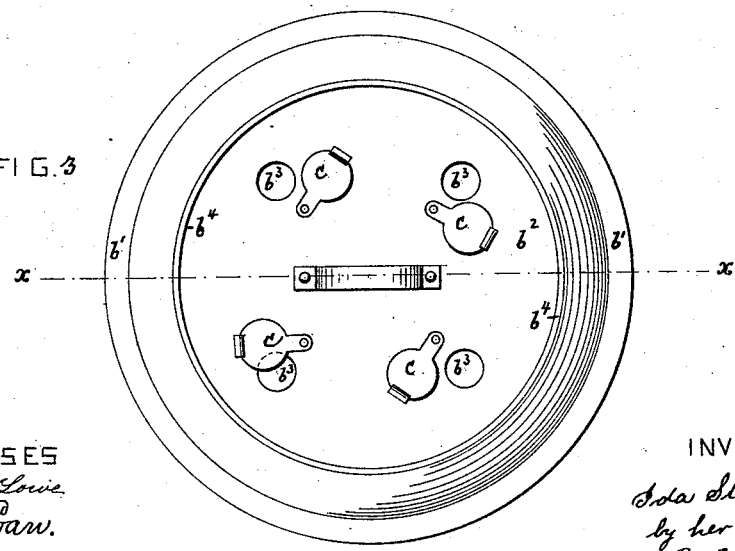

In the accompanying drawings, Figure 1 is a side elevation of my improved cooking utensil. Fig. 2 is a longitudinal section through the cover on line $x\ x$, Fig. 3; and Fig. 3 is a top view of the cover.

The letter $a$ represents a cooking-vessel of suitable form, preferably made from cast metal.

$b$ is the cover, having a flange $b'$, that fits upon vessel $a$. From the flange $b'$ the cover $b$ projects a considerable distance upward, and this upward projection is preferably made of truncated conical form, as shown. In the top plate $b^2$ of the cover $b$ I form a number of openings $b^3$, that may be closed more or less by the pivoted lids $c$. Around the upper edge of the cover there is formed an upwardly-projecting shoulder $b^4$, which prevents any overflow from running down over the edge of the cover. This shoulder consists of a bead projecting above and encircling the top plate. Thus the top plate is sunk beneath the bead, and the latter forms a continuous seamless barrier against the overflow.

In roasting beef the lids $c$ are opened to allow the steam to escape and to permit the meat to be basted in the proper manner. The basting is effected by pouring water through the openings $b^3$, and any overflow will be held back by the shoulder $b^4$ and prevented from running down, as described. In making pot-roasts and similar dishes the lids $c$ are first opened until the meat is brown, and then they are closed, so that the heat is confined, till the dish is done.

What I claim is—

The combination of vessel $a$, with cover $b$, having a surrounding upwardly-projecting bead $b^4$, a sunk perforated top plate $b^2$, and lids $c$, hinged to such top plate, substantially as specified.

IDA STEGEMANN.

Witnesses:
 F. V. BRIESEN,
 A. JONGHMANS.